Jan. 7, 1969  R. F. TAYLOR  3,420,482
ARTICLE FASTENER
Filed July 21, 1967
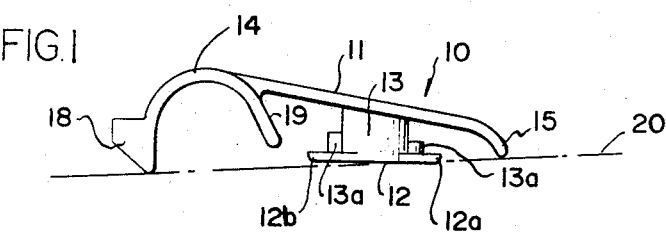
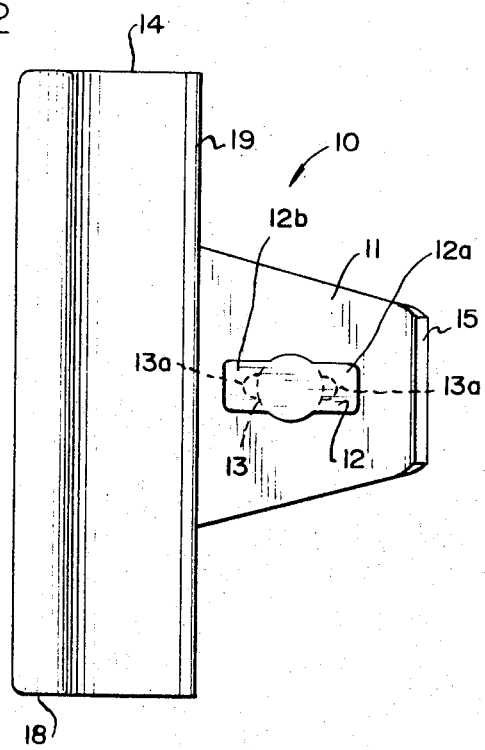
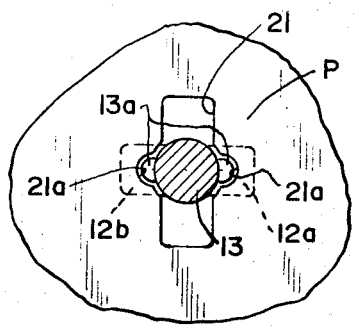
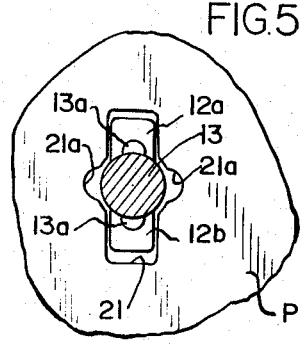
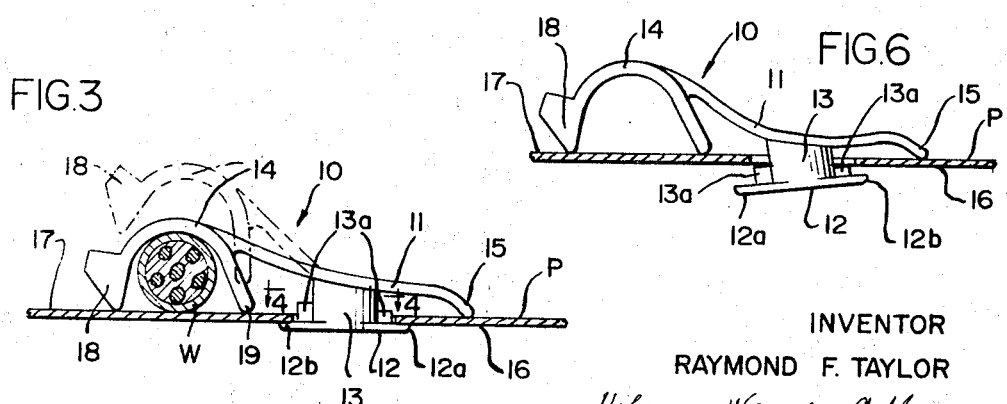
INVENTOR
RAYMOND F. TAYLOR
BY Hofgren, Wegner, Allen,
Stellman & McCord
ATTORNEYS.

United States Patent Office 3,420,482
Patented Jan. 7, 1969

3,420,482
ARTICLE FASTENER
Raymond F. Taylor, Stevensville, Mich., assignor to
Whirlpool Corporation, a corporation of Delaware
Filed July 21, 1967, Ser. No. 655,153
U.S. Cl. 248—71   11 Claims
Int. Cl. F16b *19/00;* F16b *45/00*

ABSTRACT OF THE DISCLOSURE

A fastener having means for retaining an article such as a wire to one surface of a thin panel, with the fastener having integral means for resiliently retaining the fastener in place on the panel.

---

This invention relates to wire fasteners and in particular to fasteners for retaining articles such as wires, conduits, tubes, rods, and the like to one surface of a panel.

In applications such as household appliances, it is desirable to retain articles such as electrical conducting wires along and to the surfaces of wall, or panel, portions of the appliance. As rotating machinery and the like may be disposed adjacent the wires, it is important that the retaining means be positive to preclude inadvertent slipping of the wires into engagement with such rotating machinery. Further, in such appliances, vibrations may occur during the operation of the appliance tending to loosen the fastening means and, thus, it is desirable to provide a vibration-proof fastener. Still further, in such appliances, because of the requirements of minimization of space and efficiency of construction, it is desirable to mount such fastening means substantially to one side of the panel. Still further, it is desirable to provide such a retaining means which is easily mounted on the panel and which permits ready facilitated installation of the wire therein. Still further, it is desirable to provide such retaining means which is readily removable from the panel without damage to the retaining means, the panel, or the wires. Also, it is desirable to provide such a retaining means which permits its mounting on the panel, the installation of the wires therein, and its removal from the panel all from one side of the panel. The present invention comprehends an improved fastener for retaining wires against a panel which provides the desirable features discussed above in a novel and simple manner.

Thus, a principal feature of the present invention is the provision of a new and improved fastener for retaining a wire to a panel.

Another feature of the invention is the provision of such a fastener including means for retaining the fastener on the panel having effectively minimum extension thereof in the space opposite the side of the panel to which the wire is to be affixed.

A further feature of the invention is the provision of such a fastener having new and improved means for resiliently retaining the fastener against vibration in position on the panel.

Still another feature of the invention is the provision of such a fastener having new and improved means for retaining the wire in association therewith on the panel.

Another feature of the invention is the provision of such a fastener having an extremely simple and economical construction, while yet providing each of the desirable advantages discussed above.

Other features and advantages of the invention will be apparent from the following description taken in connection with the accompanying drawing wherein:

FIGURE 1 is an end elevation of a fastener embodying the invention;
FIGURE 2 is a top plan view thereof;
FIGURE 3 is an end elevation thereof illustrating the arrangement of the fastener in retaining a wire on a panel, a flexing of the fastener to accept the wire being illustrated in dotted lines;
FIGURE 4 is a fragmentary horizontal section taken substantially along the line 4—4 of FIGURE 3;
FIGURE 5 is a fragmentary section similar to that of FIGURE 4, but with the fastener as disposed during the installation thereof on the panel; and
FIGURE 6 is an end elevation illustrating a step in the installation of the fastener on the panel.

In the exemplary embodiment of the invention as disclosed in the drawing, a fastener generally designated 10 is shown to comprise a body portion 11, a locking portion 12, a spacer portion 13, a retainer portion 14, and a support portion 15. In the illustrated embodiment, the fastener comprises a one piece structure formed of a suitable material such as molded plastic and, thus, may be formed at extremely low cost.

The fastener is adapted for use in connecting a wire such as wire W (FIGURE 3) to a wall member such as panel wall member P. As indicated briefly above, fastener 10 is adapted for use with relatively thin wall members with the fastener being disposed substantially entirely to one side of the wall member and with only a very thin portion thereof occupying space at the opposite side. Thus, as illustrated in FIGURE 3, only the relatively thin locking portion 12 is disposed adjacent the rear surface 16 of the wall panel P, and the remainder of the fastener structure is disposed adjacent the opposite surface 17 of the wall panel. Illustratively, the locking portion may comprise a flange having a small thickness such as less than approximately ⅛ inch.

As shown, body portion 11 may comprise a relatively thin flat wall element which is yieldably resilient, as illustrated in FIGURES 1, 3 and 6, respectively. Retainer portion 14 comprises a semiannular structure having an outer portion 18, and an inner portion 19. In the unflexed, unmounted arrangement of the fastener 10, outer retainer portion 18 and support portion 15 cooperatively define a plane 20, with the locking portion 12 being disposed at or above this plane as shown in FIGURE 1. More specifically, the locking portion 12 is spaced from the body portion 11 a distance less than the spacing of plane 20 from the body portion 11 plus the thickness of the panel P in the unflexed arrangement of the fastener. The inner portion 19 of the semiannular retainer 14 is spaced above the plane 20, as shown in FIGURE 1.

More specifically, retainer portion 14 comprises a semitubular, or axially elongated, annular portion having its axial extent relatively long in comparison to its diameter, as best seen in FIGURE 2. To provide an improved retention of the wire W, the axial extent of retainer portion 14 herein is made to be at least approximately three times the diameter thereof. The support portion 15, as shown in FIGURE 2, comprises a generally rectilinear edge portion which in cooperation with the outer portion 18 of the retainer 14 stabilizes the fastener against the panel, as shown in FIGURE 3.

The locking flange portion 12 defines a key structure, including a pair of diametrically opposed tabs 12a and 12b adapted to pass through a generally rectangular recess 21 in the panel P when the fastener is disposed in the position illustrated in FIGURE 5, and to underlie the panel in an interlocked engagement therewith when the fastener is turned 90 degrees from the position of FIGURE 5, as shown in FIGURE 4. The spacer portion 13 comprises a cylindrical post having a pair of locating ribs 13a on diametrically opposite sides thereof for reception in corresponding arcuate recesses 21a of the panel opening 21 for effectively locking the fastener against rotation in the installed position of FIGURE 3.

Referring now to FIGURES 4, 5 and 6, the installation of the fastener 10 on the panel P is extremely simple. The user merely places the fastener with the locking portion 12 overlying the opening 21 in the panel and presses downwardly on the body portion 11 to urge the locking portion 12 and ribs 13a to rearwardly of the surface 16 of the panel P. The fastener is then rotated 90 degrees to bring the locking portion 12 and ribs 13a to the position of FIGURE 4 whereupon release of the body portion 11 allows the resiliency thereof to urge the flanges 12a and 12b of the locking portion 12 against the surface 16 with the ribs 13a on the spacer portion 13 retaining the fastener in recesses 21a against rotation about the spacer portion 13.

As shown in FIGURE 3, in the installed arrangement of the fastener on panel P, the resiliency of body portion 11 causes the inner portion 19 of the retainer 14 to engage the surface 17 of the panel P as well as causing the outer portion 18 and the support portion 15 to engage surface 17 of the panel P, whereby each of portions 19, 18 and 15 are substantially coplanar with the outer surface 17. Thus, in the installed arrangement of the fastener, the wire W is completely enclosed within the elongated retainer portion 14 for improved retention against the panel surface 17. The portions 19, 18 and 15 of the fastener 10 engage the wall panel surface 17 along lines generally parallel to each other to provide an improved stabilized retention of the wire.

Thus, while the locking portion 12 has a thickness less than any other portion of the fastener and, thus, presents the minimum extension of the fastener beyond the rear surface 16, the fastener provides an improved positive retention of the wire W on the panel surface 17 which is effectively, positively retained notwithstanding vibration of the panel P. Fastener 10 is highly economical of construction, may be easily installed on the panel P, and provides improved positive wire retention.

While I have shown and described one embodiment of my invention, it is to be understood that it is capable of many modifications. Changes, therefore, in the construction and arrangement may be made without departing from the spirit and scope of the invention as defined in the appended claims.

The embodiment of the invention in which an exclusive property or privilege is claimed is defined as follows:

1. A fastener for retaining an article at one surface of a panel having an opening therethrough, comprising:
   a resilient body portion;
   a locking portion;
   a spacer portion for extension through said opening connecting said locking portion to said body portion whereby said body portion may be juxtaposed to said one panel surface while said locking portion is juxtaposed to the opposite surface of said panel;
   a semiannular wire retainer portion on said body portion to one side of said spacer portion and arranged to open toward said one panel surface; and
   a support portion on said body portion to the opposite side of said spacer portion and arranged to engage said one panel surface, said retainer and support portion cooperatively defining a plane transverse to said spacer portion, said spacer portion having a length preselected to space the locking portion from the body portion less than the spacing of said plane from said body portion plus the thickness of the panel in the unflexed, unmounted arrangement of the fastener and the resilient yieldability of said body portion being sufficient to permit said locking portion to be urged beyond said plane at least the thickness of the panel whereby said resilient body portion may urge said locking portion into engagement with said opposite surface of the panel and said retainer and support portion into engagement with said one surface of the panel to retain the fasteners on the panel and cause said retainer portion to define with said panel an article retaining means.

2. The fastener of claim 1 wherein said locking portion comprises a thin flange extending flatwise generally parallel to said plane.

3. The fastener of claim 1 wherein said retainer portion includes an outer portion and an inner portion intermediate said outer portion and said spacer portion, said inner portion terminating short of said plane in the unflexed, unmounted arrangement of the fastener.

4. The fastener of claim 1 wherein said retainer portion includes an outer portion and an inner portion intermediate said outer portion and said spacer portion, said inner portion termiting short of said plane in the unflexed, unmounted arrangement of the fastener, said retainer portion being carried on said body portion to reposition said inner portion to terminate substantially in said plane when said fastener is retained in the panel with said locking portion maintaining the body portion in the resiliently flexed arrangement.

5. The fastener of claim 1 wherein said retainer portion comprises a semitubular portion having an axial extent at least approximately three times the diameter thereof.

6. The fastener of claim 1 wherein said portions comprise a one piece structure.

7. The fastener of claim 1 wherein said body portion comprises a thin wall structure.

8. The fastener of claim 1 wherein said support portion comprises an elongated edge structure extending parallel to the axis of said semiannular retainer.

9. The fastener of claim 1 wherein said locking portion has a thickness less than that of any of said other portions.

10. The fastener of claim 1 wherein said locking portion comprises a thin wall structure having a thickness of less than approximately 1/8 inch.

11. The fastener of claim 1 wherein said spacer means includes means for cooperating with said panel for preventing rotation of said fastener about the panel when in its mounted arrangement.

References Cited
UNITED STATES PATENTS

| | | | |
|---|---|---|---|
| 1,772,687 | 8/1930 | Reinke | 24—73 X |
| 2,318,853 | 5/1943 | Hall | 24—73 |
| 2,836,215 | 5/1958 | Rapta | 174—40 X |
| 3,154,281 | 10/1964 | Frank | 248—201 |
| 3,210,030 | 10/1965 | Ramsey | 248—71 |

CHANCELLOR E. HARRIS, *Primary Examiner.*

U.S. Cl. X.R.

174—164; 24—73; 248—220.5